(12) United States Patent
Pinewski et al.

(10) Patent No.: US 10,348,089 B2
(45) Date of Patent: Jul. 9, 2019

(54) TECHNIQUES FOR CONTROLLING A/C POWER DISTRIBUTION IN POWERED FURNITURE

(71) Applicant: Ergotron, Inc., St. Paul, MN (US)

(72) Inventors: Thomas Peter Pinewski, Minneapolis, MN (US); Nicholas Simon Hazzard, Minneapolis, MN (US); Jeffrey Aymond, Burnsville, MN (US); William Dale Tischer, Shoreview, MN (US); Jason Charles Jaeger, Minneapolis, MN (US)

(73) Assignee: Ergotron, Inc., St. Paul, MN (US)

( * ) Notice: Subject to any disclaimer, the term of this patent is extended or adjusted under 35 U.S.C. 154(b) by 205 days.

(21) Appl. No.: 15/609,634

(22) Filed: May 31, 2017

(65) Prior Publication Data

US 2018/0351360 A1     Dec. 6, 2018

(51) Int. Cl.
*H02J 3/14*         (2006.01)
*H02J 13/00*        (2006.01)

(52) U.S. Cl.
CPC ............ *H02J 3/14* (2013.01); *H02J 13/0062* (2013.01)

(58) Field of Classification Search
CPC ......... H02J 13/0062; H02J 3/14; A47B 21/06; A47B 2021/066; H01R 24/76; H01R 2103/00
USPC .................................................... 307/12, 31
See application file for complete search history.

(56) References Cited

U.S. PATENT DOCUMENTS

| | | |
|---|---|---|
| 4,175,238 A | 11/1979 | Breimesser et al. |
| 4,499,385 A | 2/1985 | Slavik |
| 4,760,276 A | 7/1988 | Lethellier |
| 5,208,485 A | 5/1993 | Krinsky et al. |
| 5,359,540 A | 10/1994 | Ortiz |
| 5,424,903 A | 6/1995 | Schreiber |
| 5,436,788 A | 7/1995 | Wallaert |
| 5,589,718 A | 12/1996 | Lee |
| 5,604,385 A | 2/1997 | David |
| 5,637,933 A | 6/1997 | Rawlings et al. |

(Continued)

FOREIGN PATENT DOCUMENTS

WO      2018222735      12/2018

OTHER PUBLICATIONS

"International Application Serial No. PCT US2018 035163, International Search Report dated Aug. 17, 2018", 3 pgs.

(Continued)

*Primary Examiner* — Carlos Amaya
(74) *Attorney, Agent, or Firm* — Schwegman Lundberg & Woessner, P.A.

(57) ABSTRACT

A powered furniture system can include at least a first article of powered furniture having a control circuit, a first number of power outlets, and a first identification circuit, and a second article of powered furniture having a second number of power outlets and a second identification circuit. A method of controlling power distribution in the system can include separately communicating with the first and second identification circuits over a communications channel, receiving data representing the first and second numbers of power outlets, determining, using the received data representing the first and second numbers of power outlets, a total number of power outlets in the system, and controlling application of power to the first and second numbers of (Continued)

power outlets using the determined total number of power outlets in the system.

23 Claims, 5 Drawing Sheets

(56) References Cited

U.S. PATENT DOCUMENTS

| | | |
|---|---|---|
| 5,923,103 A | 7/1999 | Pulizzi et al. |
| 5,967,820 A | 10/1999 | Siegal et al. |
| 6,031,302 A | 2/2000 | Levesque |
| 6,211,796 B1 | 4/2001 | Toms et al. |
| 6,815,842 B2 | 11/2004 | Fehd et al. |
| 6,857,896 B2 | 2/2005 | Rupert et al. |
| 7,075,769 B2 | 7/2006 | Rupert et al. |
| 8,330,056 B2 | 12/2012 | Ty et al. |
| 8,350,406 B2 | 1/2013 | Byrne et al. |
| 8,680,709 B2 | 3/2014 | Byrne et al. |
| 9,166,308 B2 | 10/2015 | Byrne |
| 9,331,464 B2 | 5/2016 | Ty et al. |
| 9,438,023 B2 | 9/2016 | Ty et al. |
| 10,186,900 B2 | 1/2019 | Pinewsk et al. |
| 2003/0194904 A1 | 10/2003 | Rupert et al. |
| 2008/0280470 A1 | 11/2008 | Byrne |
| 2011/0088941 A1 | 4/2011 | Ty et al. |
| 2012/0261988 A1 | 10/2012 | Byrne et al. |
| 2013/0021720 A1 | 1/2013 | Ty et al. |
| 2015/0255932 A1 | 9/2015 | Dicks et al. |
| 2018/0248404 A1 | 8/2018 | Pinewski et al. |

OTHER PUBLICATIONS

"International Application Serial No. PCT US2018 035163, Written Opinion dated Aug. 17, 2018", 8 pgs.

"U.S. Appl. No. 15/441,685, Notice of Allowance dated Sep. 12, 2018", 10 pgs.

TECHNIQUES FOR CONTROLLING A/C POWER DISTRIBUTION IN POWERED FURNITURE

CROSS-REFERENCE TO RELATED PATENT DOCUMENTS

This patent application is related to U.S. patent application Ser. No. 15/441,685, titled "TECHNIQUES FOR CONTROLLING A/C POWER DISTRIBUTION IN POWERED FURNITURE," to Pinewski et al., and filed on Feb. 24, 2017, the entire contents of which being incorporated herein by reference.

TECHNICAL FIELD

This disclosure pertains generally, but not by way of limitation, to power distribution techniques.

BACKGROUND

Powered furniture has been growing in popularity in various locations, including workplaces, hospitals, and even schools. By adding access to A/C power directly to powered furniture, including modular workstations, for example, various electronic equipment, including laptops, cell phones, tablets, can be powered.

To be fully functional, powered furniture, including modular workstations, can adapt to the orientation of each classroom, conference room, hospital room, and the like in which they are placed. For example, powered modular workstations can be easily moved to accommodate a large room, e.g., a conference room at a hotel, where the orientation of the room routinely changes depending on its use.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

OVERVIEW

This disclosure is directed to techniques for controlling A/C power distribution in a powered furniture system that can include articles of furniture, e.g., two or more, configured to receive power from a power source. Non-limiting examples of articles of powered furniture can include modular workstations, tables, benches, and the like.

In some example implementations, this disclosure is directed to a method of controlling power distribution in a powered furniture system including at least a first article of powered furniture having a control circuit, a first number of power outlets, and a first identification circuit, and a second article of powered furniture having a second number of power outlets and a second identification circuit. The method comprises separately communicating with the first and second identification circuits over a communications channel, receiving data representing the first and second numbers of power outlets, determining, using the received data representing the first and second numbers of power outlets, a total number of power outlets in the system, controlling application of power to the first and second numbers of power outlets using the determined total number of power outlets in the system.

In some example implementations, this disclosure is directed to a power distribution system to control power distribution in a powered furniture system having at least a first article of powered furniture and a second article of powered furniture. The system comprises the first article of powered furniture having a first number of power outlets, a first identification circuit, and a control circuit. The control circuit is configured to separately communicate over a communications channel with the first identification circuit and a second identification circuit associated with the second article of powered furniture, wherein the second article of furniture includes a second number of power outlets, receive data representing the first and second numbers of power outlets, determine, using the received first and second numbers of power outlets, a total number of power outlets in the system, control application of power to the first and second numbers of power outlets using the determined total number of power outlets in the system.

In some example implementations, this disclosure is directed to a power distribution system to control power distribution in a powered furniture system having at least a first article of powered furniture. The system comprises the first article of powered furniture having a first number of power outlets, a first identification circuit, and a control circuit. The control circuit is configured to separately communicate over a communications channel with the first identification circuit and a second identification circuit associated with a second number of power outlets, receive data representing the first and second numbers of power outlets, determine, using the received first and second numbers of power outlets, a total number of power outlets in the system, and control application of power to the first and second numbers of power outlets using the determined total number of power outlets in the system.

DETAILED DESCRIPTION

Powered furniture (also referred to in this disclosure as "articles of powered furniture" or "articles of furniture") can be designed to be movable and adaptable. As described in detail below, the powered furniture of this disclosure, including modular workstations, tables, benches, etc., can be connected together in series (or "daisy-chained") such that each article of furniture can draw power from a previous article of furniture in the chain, and the first article of furniture can draw power from a wall outlet. In some examples, the articles of furniture can be separated and moved, e.g., rolled, across a room and connected in a different order or configuration, and individual articles of furniture can be connected to a different system of powered furniture.

Like other powered items, powered furniture currently must comply with various safety standards. For example, powered furniture currently must comply with Underwriters Laboratories (UL) 962 "Standard for Household and Commercial Furnishings." As currently written, UL 962 essentially states that no more than eight outlets can be daisy chained together in a system of powered furniture, e.g., tables. In some examples, an outlet can be a duplex outlet. In other examples, an outlet can be a triplex outlet. In some examples, an outlet can have between one and three receptacles. In other examples, an outlet can have more than 3 receptacles.

To comply with the current UL 962 standard, a number of example configurations of powered tables, for example, are possible. For example, eight tables, each having one built-in outlet, could be daisy-chained together. As another example, if a table has four built-in outlets, two tables could be daisy-chained together. A problem to be solved is determining how to limit the powered outlets to a maximum of eight even if the user daisy chains together a system with more than eight outlets.

Figure 1:
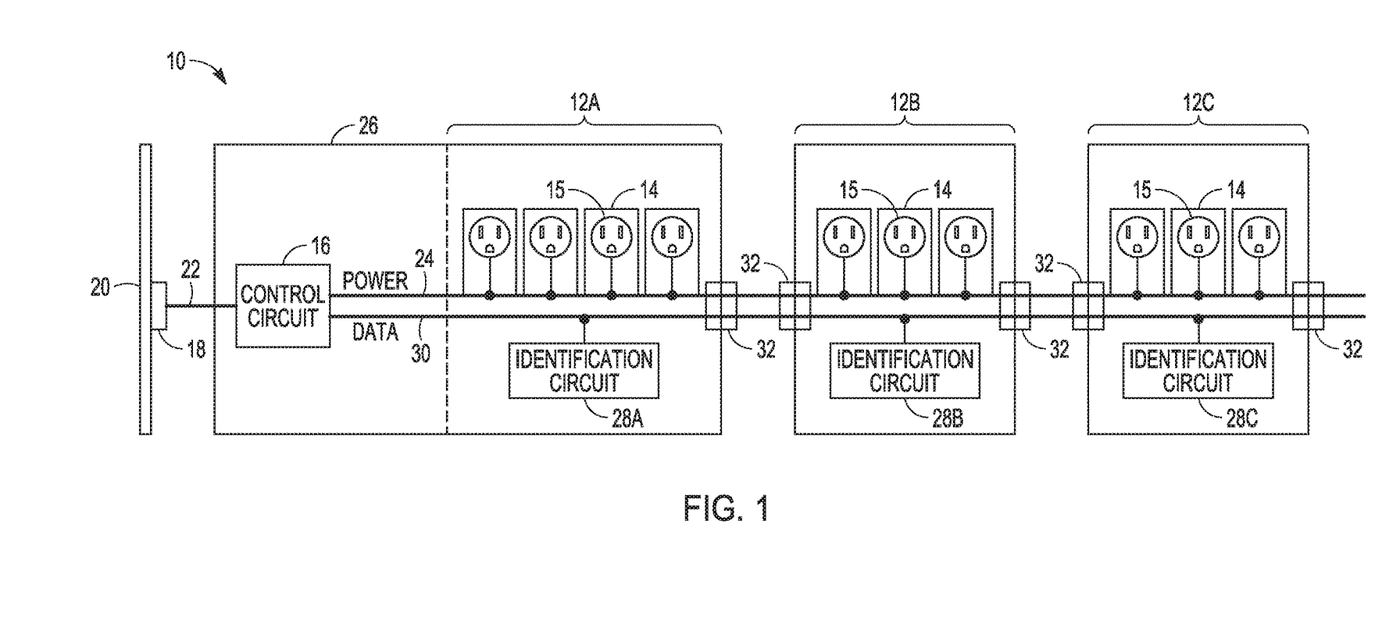
FIG. 1 illustrates an example configuration of a powered furniture system using various techniques of this disclosure.

FIG. 1 illustrates an example configuration of a powered furniture system 10 using various techniques of this disclosure. The powered furniture system 10 (a non-limiting example being shown in FIG. 1) can include one or more articles of furniture configured to receive power and supply the power to the power outlets associated with the respective articles of powered furniture. The non-limiting example system 10 shown in FIG. 1 includes three articles of powered furniture 12A-12C (also referred to in this disclosure as powered furniture 12), e.g., tables, workstations, and the like.

Each article of powered furniture 12 can include one or more power outlets 14. For example, in the non-limiting example shown in FIG. 1, the first article of powered furniture 12A can include four power outlets 14, the second article of powered furniture 12B can include three power outlets 14, and the third article of powered furniture 12C can include three power outlets 14. Other example configurations can include more (or less) power outlets. Each of the outlets 14 can include one or more electrical receptacles 15.

In FIG. 1, the first article of furniture 12A can include a control circuit 16 (shown in more detail in FIG. 2) that can be connected to an AC power source, e.g., a wall outlet 18 of a wall 20, using a power cord 22 having line and neutral conductors. Using various techniques of this disclose and as described in more detail below, the control circuit 16 can control a contact or a switch, for example, to enable or disable power to a power bus 24 that is coupled to the various power outlets of the system.

A control circuit housing 26 can enclose the control circuit 16. In some example implementations, the housing 26 can attach to and detach from any of the articles of powered furniture 12 such that the system 10 can be reconfigured to allow any of the articles of powered furniture 12 to be positioned first in a daisy-chain configuration. In other example implementations, rather than be attached to an article of furniture, the housing 26 can be separate and can be positioned between the AC power source, e.g., wall outlet, and an article of furniture. For example, the housing 26 can rest on a floor between the wall outlet 18 and the article of furniture 12A.

Each of the articles of powered furniture 12A-12C can include a respective identification circuit 28A-28C (also referred to in this disclosure as an identification circuit 28). As shown in FIG. 1, the system 10 can include a communications channel 30 ("data") to which each identification circuit 28 can be coupled. Examples of communications channels can include wired communication protocols, such as I²C bus, or wireless communication protocol, such as Bluetooth® or WiFi, or powerline communications, among other communication methods. The identification circuits 28A-28C can be connected to the control circuit 16 in parallel using the communications channel 30. The communication channel 30 can include a low voltage DC power bus to power the identification circuits. In other example implementations, an article of powered furniture can include more than one identification circuit.

Electrical power and data can be transferred from one article of powered furniture to another article of powered furniture by connectors 32. The power bus 24 and the communication channel 30 can include all necessary power and data wiring and connectors needed for any type of computer, communications, and/or electrical connection.

As described in detail below, the control circuit 16 can separately communicate with the identification circuits 28A-28C over the communications channel 30. Upon being addressed, an identification circuit of an article of powered furniture can transmit to the control circuit 16 data representing the number of power outlets associated with that article of powered furniture. The control circuit 16 can receive data representing the number of power outlets associated with all the articles of powered furniture in the system and determine a total number of power outlets in the system. Then, the control circuit 16 can control application of power to the power outlets in the system using the determined total number of power outlets in the system.

Figure 2:
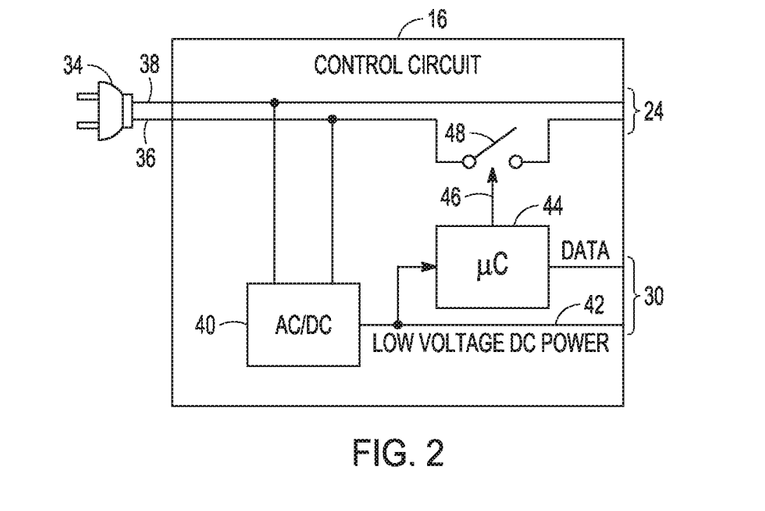
FIG. 2 is a block diagram of an example of a control circuit that can be used to implement various techniques of this disclosure.

FIG. 2 is a block diagram of an example of a control circuit that can be used to implement various techniques of this disclosure. The control circuit 16 can include a power cord 34 having line 36 and neutral 38 conductors to connect to an AC power source, e.g., a wall outlet 18 of a wall 20 of FIG. 1. As shown in FIG. 2, the control circuit 16 can include an AC/DC converter 40 coupled to the line and neutral conductors 36, 38 to generate a low voltage DC power output 42.

In addition, the control circuit 16 can include a microcontroller circuit 44 powered by the low voltage DC power output 42. The microcontroller 44 can output a control signal 46 to control a switch 48 (or a contact of a relay) coupled in line with the power conductor 36. As described below, the microcontroller 44 can control the switch 48 to enable or disable power to the power bus 24 that is coupled to the various power outlets of the system. In some examples, the control circuit 16 can also include safety circuitry (not shown) to detect and protect the system 10 of FIG. 1 from faults that could create safety hazards.

The microcontroller 44 can also receive and output data on the communications channel 30. The control circuit 16 and, in particular, the microcontroller 44, can separately communicate with the identification circuits 28A-28C over the communications channel 30. The microcontroller 44 can receive data representing the number of power outlets associated with all the articles of powered furniture in the system and determine a total number of power outlets in the system.

For example, during manufacture of the article of furniture, for example, each identification circuit 28 of an article of furniture can be programmed with and store, e.g., in a memory circuit, data representing a number of outlets associated with the article of furniture. By way of a non-limiting example, in the configuration shown in FIG. 1, the identification circuit 28A can store data representing that four outlets are associated with the first article of furniture, the identification circuit 28B can store data representing that three outlets are associated with the second article of furniture, and the identification circuit 28C can store data representing that three outlets are associated with the third article of furniture.

In addition, the control circuit 16 can be programmed with and store, e.g., in a memory circuit, data representing a maximum number, e.g., predetermined number, of outlets for a system that can be powered and comply with UL 962, for example, which is currently eight outlets.

The microcontroller 44 can receive, using the communications channel 30, data from all the identification circuits 28A-28C representing a number of power outlets in all of the articles of powered furniture electrically connected in the system. Then, the microcontroller 44 can sum the data representing the number of power outlets to determine a total number of power outlets. Using the comparison, the control circuit 16 can allow application of power to the power outlets in the system when the total number of power outlets does not exceed the maximum number permitted.

If the total number does not exceed the number allowed, e.g., currently no more than eight outlets per UL 962, the microcontroller 44 can output a signal to control the switch 48 to close, thereby enabling power to the power bus 24 to provide power to all of the articles of powered furniture 12. For example, the microcontroller 44 can compare the received data to a maximum number stored in memory, e.g., eight outlets. However, if the total number exceeds the number allowed, the microcontroller 44 can either output a signal to control the switch 48 to open, thereby disabling power to the power bus 24 and removing power from all of the articles of powered furniture, or if the switch 48 is already open, the microcontroller 44 can maintain the switch position in the open state. In this manner, the microcontroller 44 can control application of power to the power outlets in the system using the determined total number of power outlets in the system.

Figure 3:
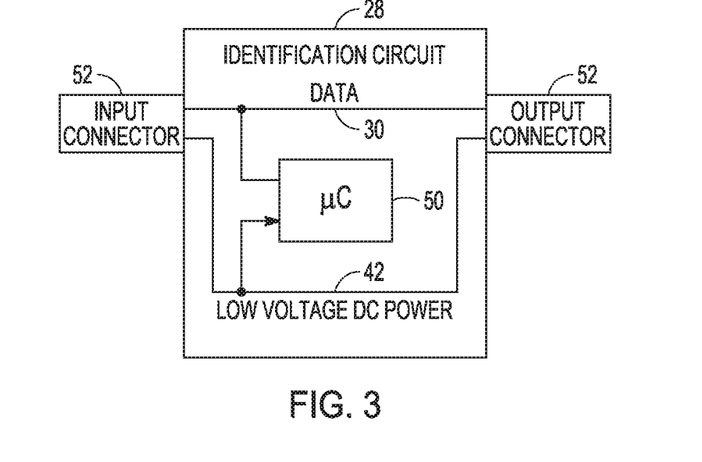
FIG. 3 is a block diagram of an example of an identification circuit that can be used to implement various techniques of this disclosure.

FIG. 3 is a block diagram of an example of an identification circuit that can be used to implement various techniques of this disclosure. The identification (ID) circuit 28 can include an ID microcontroller circuit 50 coupled to the data bus 30 and the low voltage DC power bus 42. The ID circuit 28 can include two connectors 52 to couple the ID circuit 28 to the data bus 30. The ID circuit 28 can also include safety circuitry to detect and protect the system 10 of FIG. 1 from faults that could create safety hazards.

The ID microcontroller 50 can be configured to communicate with the control circuit 16 and, in particular, the microcontroller 44 of the control circuit 16 using a communications protocol. For example, the ID microcontroller 50 and the microcontroller 44 of the control circuit 16 can utilize an Inter-integrated Circuit ($I^2C$) communications protocol and the communications channel 30 can be configured as an $I^2C$ channel or bus. In other example configurations, the ID microcontroller 50 and the microcontroller 44 of the control circuit 16 can utilize a Serial Peripheral Interface (SPI) interface.

Each ID circuit 28 can be programmed to include a unique address. The unique address can be stored in a memory circuit in the ID microcontroller 50 or in a separate memory circuit, for example. In some example implementations, when an ID circuit 28 powers up, the ID microcontroller 50 can transmit its unique address to the control circuit 16 over the communications channel 30. Additionally or alternatively, the ID microcontroller 50 can periodically transmit its unique address to the control circuit 16 over the communications channel 30. Using these techniques, when another article of furniture joins the system, the control circuit 16 can receive the unique address of the article of furniture and can store the unique address in a memory circuit.

Using the unique addresses, the control circuit 16 can address and separately communicate with all the identification circuits of the system, e.g., identification circuits 28A-28C of FIG. 1, over the communications channel 30. For example, the control circuit 16 can transmit a packet (or other protocol data unit) that can include a unique address associated with an article of furniture. In some non-limiting examples, the first byte of the packet can include the unique destination address. Each ID circuit 28 can read the address and, if the address of the packet matches the address associated with the ID circuit, then the ID circuit can read the packet, e.g., the payload of the packet, and respond accordingly.

The control circuit 16 can then receive data representing the number of power outlets associated with each of the articles of furniture in the system, e.g., the articles of furniture 12A-12C of FIG. 1. For example, in FIG. 1, the identification circuit 28A can retrieve and transmit to the control circuit 16 data representing that four outlets associated with the first article of furniture 12A, the identification circuit 28B can retrieve and transmit to the control circuit 16 data representing the three outlets associated with the second article of furniture 12B, and the identification circuit 28C can retrieve and transmit to the control circuit 16 data representing the three outlets associated with the third article of furniture 12C.

The microcontroller 44 of the control circuit 16 can determine a total number of power outlets in the system using the numbers of power outlets received. For example, the microcontroller 44 of the control circuit 16 can sum the data representing the number of power outlets received to determine the total number of power outlets. The microcontroller 44 of the control circuit 16 can then control application of power to the power outlets of the system using the determined total number of power outlets in the system, as described above with respect to FIG. 2.

In some example configurations, the control circuit 16 can disconnect power to all the power outlets in the system prior to separately communicating with the identification circuits over the communications channel. The control circuit 16 can then determine whether the total number of power outlets in the system exceeds a maximum number and, using the determination, control application of power, as described above.

In some example implementations, after the control circuit 16 has allowed application of power to the power outlets in the system, the control circuit 16 can detect a connection of another (previously unconnected) article of powered furniture to the other articles of powered furniture, where the new article of powered furniture includes a number of power outlets and an identification circuit. In response to detecting the connection of the article of powered furniture, e.g., by receiving a packet (or other protocol data unit) having the unique address of the article of powered furniture, the control circuit 16 can disconnect power to the previously powered power outlets, e.g., the microcontroller 44 can open the switch 48 of FIG. 2.

The control circuit 16 can then separately communicate with all of the identification circuits over the communications channel. In response, the control circuit 16 can receive data representing the number of power outlets associated with the connected identification circuits and determine, using the received data representing the numbers of power outlets, a total number of power outlets in the system. The control circuit 16 can then control application of power to the power outlets using the determined total number of power outlets in the system, as described above.

Figure 4:
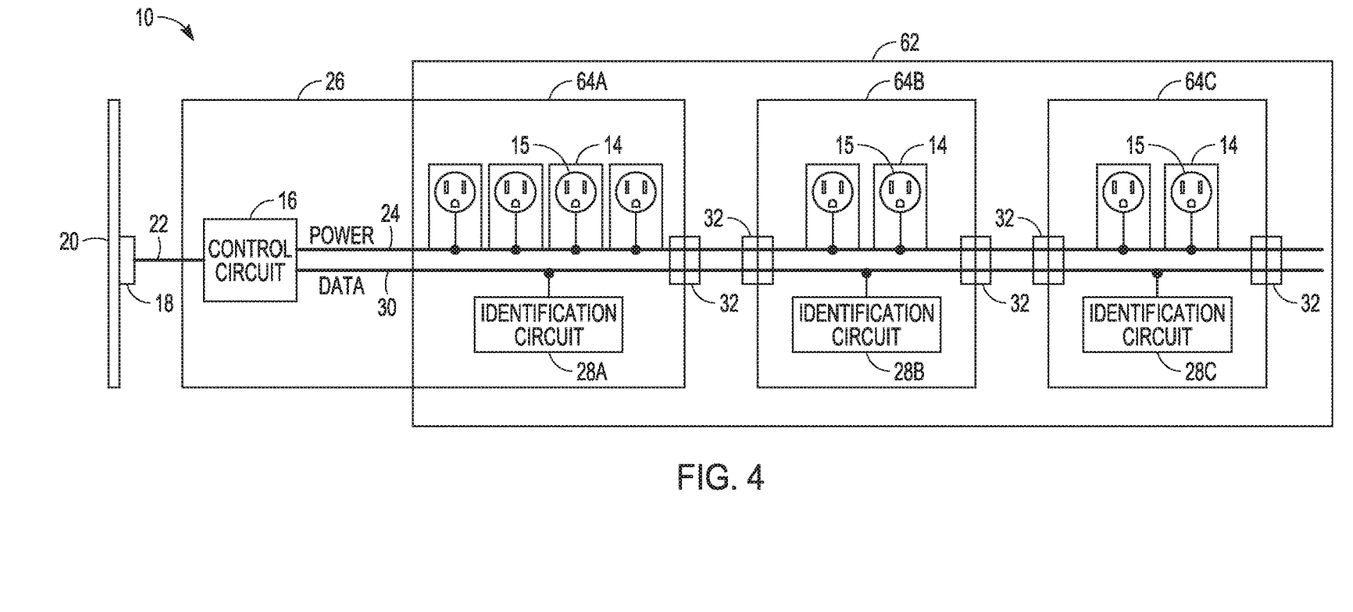
FIG. 4 illustrates another example configuration of a powered furniture system using various techniques of this disclosure.

FIG. 4 illustrates another example configuration of a powered furniture system 60 using various techniques of this disclosure. In contrast to FIG. 1, which depicts a system of three articles of powered furniture, the system 60 of FIG. 4 depicts a single article of powered furniture 62 that can include one or more separate power modules 64A-64C that can be physically attached, as needed, to a single article of furniture 62. In the non-limiting example shown in FIG. 4, the first power module 64A can include four power outlets 14, the second power module 64B can include two power outlets 14, and the third power module 64C can include two power outlets 14. Other example configurations can include more (or less) power outlets. Each of the outlets 14 can include one or more electrical receptacles.

Although the power modules 64A-64C can be physically coupled to the single article of powered furniture 62 in FIG. 4, each of the power modules 64A-64C can be associated with separate articles of powered furniture (not depicted). For example, the first power module 64A can be associated with a first table 62, the second power module 64B can be associated with a second table (not depicted), and the third power module 64C can be associated with a third table (not depicted). In this configuration, electronic equipment located on the second and third tables can be connected to dedicated outlets for these tables that are physically located on the first table 62.

The operation of the control circuit 16 and the identification circuits 28 of FIG. 4 operate similarly to what was described above with respect to FIG. 1 and, for purposes of conciseness, will not be described again.

Figure 5:
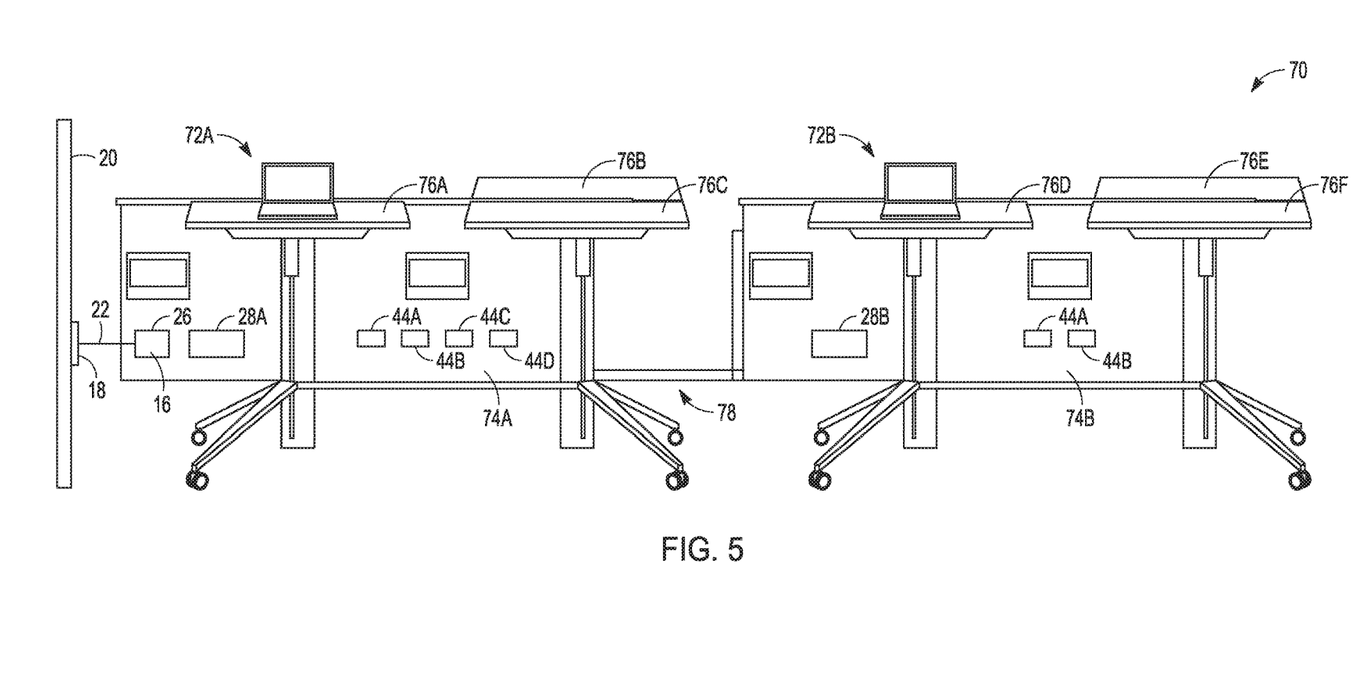
FIG. 5 illustrates an example configuration of a powered furniture system using various techniques of this disclosure.

FIG. 5 illustrates an example configuration of a powered furniture system 70 using various techniques of this disclosure. In the example system 70 depicted, two articles of powered furniture, in particular, two workstation assemblies 72A, 72B can include panels 74A, 74B that can be connected. The panels 74A, 74B of the workstation assemblies 72A, 72B can be connected to provide a plurality of height adjustable worksurfaces 76A-76F to accommodate a number of users. The panels 74A, 72B can be physically connected together, and electrical systems of each workstation assembly 72A, 72B can also be connected.

Electrical power can be transferred from a workstation assembly 72A to another workstation assembly 72B by a connection 78, e.g., using a connector 32 of FIG. 1, that can include the line and neutral conductors of power bus 23 and the communication channel 30. The connection 78 can include all necessary power or network wiring and connectors needed for any type of computer, communications, and/or electrical connection. Additional workstations (not depicted) can be added so that the workstations can be connected in a daisy-chain configuration.

As seen in FIG. 5, the system 70 can include a control circuit 16 to control power distribution to workstation assemblies 72A, 72B in the powered furniture system 70, including one or more outlets 44A-44D. Workstation assemblies 72A, 72B can include ID circuits 28A, 28B, respectively. In the non-limiting example configuration shown in FIG. 5, the workstation 72A includes four outlets 44A-44D, and the workstation 72B includes two outlets 44A-44B. Although FIG. 5 depicts the control circuit housing 26 coupled to the work station 72A, in some example implementations, the housing 26 can be physically detached from the workstation 72A, and positioned between the AC power source, e.g., wall outlet 22 and the workstation 72A.

Figure 6:
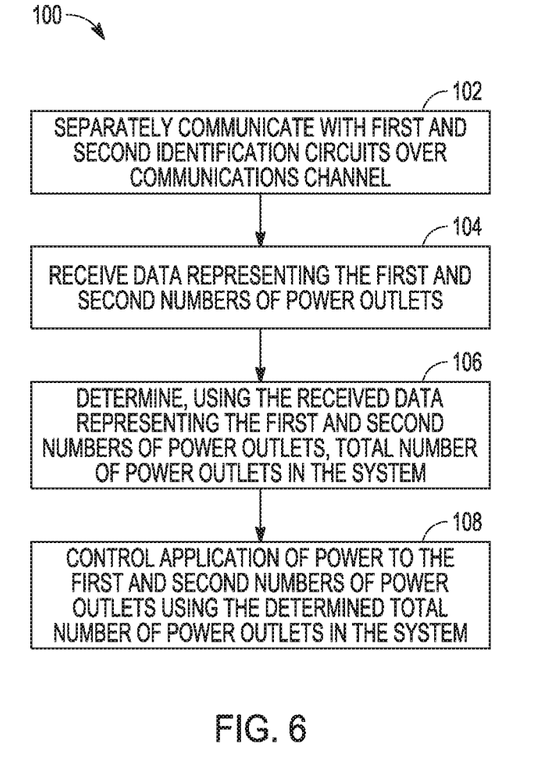
FIG. 6 is a flow diagram of an example of a method that can implement various techniques of this disclosure.

FIG. 6 is a flow diagram of an example of a method 100 that can implement various techniques of this disclosure. At block 102, a control circuit, e.g., the control circuit 16 of FIG. 2, can an address and separately communicate with one or more identification circuits, e.g., ID circuit 28 of FIG. 3, over a communications channel, as described above. At block 104, the control circuit can receive data representing the number of power outlets associated with the one or more connected articles of powered furniture, e.g., articles of powered furniture 12A-12C of FIG. 1. In other examples, each identification circuit can separately generate its own unique address.

At block 106, the control circuit can determine a total number of power outlets in the system using the received data representing the number of power outlets. At block 108, the control circuit can control application of power to the power outlets associated with the one or more connected articles of powered furniture using the determined total number of power outlets in the system, or the power modules 64A-64C, for examples, physically coupled to a single article of powered furniture.

For example, the control circuit 16 of FIG. 2 can compare the total number of power outlets to a maximum number retrieved from memory 34, e.g., currently eight outlets, per UL 962. If the total number is less than or equal to the maximum, then the control circuit can allow application of power to all of the outlets in the system. If the total number is not less than or equal to the maximum number allowed, then the control circuit can prevent application of power to all the outlets.

ADDITIONAL NOTES AND ASPECTS

The above detailed description includes references to the accompanying drawings, which form a part of the detailed description. The drawings show, by way of illustration, specific embodiments in which the invention can be practiced. These embodiments are also referred to herein as "examples" or "aspects". Such examples or aspects can include elements in addition to those shown or described. However, the present inventor also contemplates examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

In some embodiments, various techniques of this disclosure can be implemented using pre-defined logic that performs a specific logic function, in addition to or instead of sequentially executed code. For example, various aspects of this disclosure can be implemented at least in part by dedicated circuitry or logic that is permanently configured to perform certain operations, including, for example, a special-purpose processor, such as a field programmable gate array (FPGA) or an ASIC.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

The invention claimed is:

1. A method of controlling power distribution in a powered furniture system including at least a first article of powered furniture having a control circuit, a first number of power outlets, and a first identification circuit, and a second article of powered furniture having a second number of power outlets and a second identification circuit, the method comprising:
   separately communicating with the first and second identification circuits over a communications channel;
   receiving data representing the first and second numbers of power outlets;
   determining, using the received data representing the first and second numbers of power outlets, a total number of power outlets in the system;
   controlling application of power to the first and second numbers of power outlets using the determined total number of power outlets in the system.

2. The method of claim 1, further comprising:
   retrieving the data representing the first and second numbers of power outlets from respective memory devices associated with the first and second identification circuits; and
   transmitting the data over the communications channel to the control circuit.

3. The method of claim 1, wherein determining, using the received first and second numbers of power outlets, a total number of power outlets in the system includes:
   summing the data representing the first number of power outlets associated with the first article of powered furniture and the data representing the second number of power outlets associated with the second article of powered furniture to determine the total number of power outlets.

4. The method of claim 3, wherein controlling application of power to the first and second numbers of power outlets using the determined total number of power outlets in the system includes:
   comparing the total number of power outlets in the system to a maximum number of power outlets; and
   using the comparison, allowing application of power to the first and second number of power outlets when the total number of power outlets does not exceed the maximum number.

5. The method of claim 1, further comprising:
   prior to separately communicating with the first and second identification circuits over a communications channel, disconnecting power to the first number of power outlets and the second number of power outlets.

6. The method of claim 1, wherein controlling application of power to the first and second numbers of power outlets using the determined total number of power outlets in the system includes allowing application of power to the first and second numbers of power outlets, the method further comprising:
   after allowing application of power to the first and second numbers of power outlets, detecting a connection of a third article of powered furniture to one of the first and second articles of powered furniture, wherein the third article of powered furniture includes a third number of power outlets and a third identification circuit;
   disconnecting power to the first number of power outlets and the second number of power outlets;
   separately communicating with the first, second, and third identification circuits over a communications channel;
   receiving data representing the first, second, and third numbers of power outlets;
   determining, using the received data representing the first, second, and third numbers of power outlets, a total number of power outlets in the system; and
   controlling application of power to the first, second, and third numbers of power outlets using the determined total number of power outlets in the system.

7. The method of claim 1, wherein the communications channel includes an I$^2$C bus, and wherein separately communicating with the first and second identification circuits over a communications channel includes using an I$^2$C protocol.

8. A power distribution system to control power distribution in a powered furniture system having at least a first article of powered furniture and a second article of powered furniture, the system comprising:
   the first article of powered furniture having a first number of power outlets, a first identification circuit, and a control circuit, the control circuit configured to:

separately communicate over a communications channel with the first identification circuit and a second identification circuit associated with the second article of powered furniture, wherein the second article of furniture includes a second number of power outlets;

receive data representing the first and second numbers of power outlets;

determine, using the received first and second numbers of power outlets, a total number of power outlets in the system;

control application of power to the first and second numbers of power outlets using the determined total number of power outlets in the system.

9. The system of claim 8, wherein the first and the second identification circuits include unique addresses.

10. The system of claim 8, wherein the control circuit configured to determine, using the received first and second numbers of power outlets, a total number of power outlets in the system is configured to:

sum the data representing the first number of power outlets associated with the first article of powered furniture and the data representing the second number of power outlets associated with the second article of powered furniture to determine the total number of power outlets.

11. The system of claim 10, wherein the control circuit configured to control application of power to the first and second numbers of power outlets using the determined total number of power outlets is further configured to:

compare the total number of power outlets in the system to a maximum number of power outlets; and using the comparison, allow application of power to the first and second number of power outlets when the total number of power outlets does not exceed the maximum number.

12. The system of claim 8, wherein the control circuit is configured to:

prior to separately communicating with the first and second identification circuits over a communications channel, disconnect power to the first number of power outlets and the second number of power outlets.

13. The system of claim 8, wherein the control circuit configured to control application of power to the first and second numbers of power outlets using the determined total number of power outlets in the system is configured to allow application of power to the first and second numbers of power outlets, and wherein the control circuit is further configured to:

after allowing application of power to the first and second numbers of power outlets, detect a connection of a third article of powered furniture to one of the first and second articles of powered furniture, wherein the third article of powered furniture includes a third number of power outlets and a third identification circuit;

disconnect power to the first number of power outlets and the second number of power outlets;

separately communicate with the first, second, and third identification circuits over a communications channel;

receive data representing the first, second, and third numbers of power outlets;

determine, using the received data representing the first, second, and third numbers of power outlets, a total number of power outlets in the system; and control application of power to the first, second, and third numbers of power outlets using the determined total number of power outlets in the system.

14. The system of claim 8, wherein the control circuit, the first identification circuit, and the second identification circuit have unique addresses.

15. The system of claim 8, further comprising:

a control circuit housing to enclose the control circuit, wherein the control circuit housing is attachable to either the first or second article of powered furniture.

16. The system of claim 8, wherein the first identification circuit and the second identification circuit are connected to the control circuit in parallel.

17. The system of claim 8, wherein the control circuit is configured to receive power from a wall outlet.

18. The system of claim 17, wherein the control circuit includes a switch, and wherein the control circuit configured to control application of power to the first and second numbers of power outlets using the determined total number of power outlets in the system is configured to:

control the switch to connect the power from the wall outlet to the first and second numbers of power outlets.

19. The system of claim 8, wherein the communications channel includes an $I^2C$ bus.

20. A power distribution system to control power distribution in a powered furniture system having at least a first article of powered furniture, the system comprising:

the first article of powered furniture having a first number of power outlets, a first identification circuit, and a control circuit, the control circuit configured to:

separately communicate over a communications channel with the first identification circuit and a second identification circuit associated with a second number of power outlets;

receive data representing the first and second numbers of power outlets;

determine, using the received first and second numbers of power outlets, a total number of power outlets in the system; and control application of power to the first and second numbers of power outlets using the determined total number of power outlets in the system.

21. The system of claim 20, wherein the first and the second identification circuits include unique addresses.

22. A power distribution system to control power distribution in a powered furniture system having at least a first article of powered furniture, the system including:

the first article of powered furniture having a first number of power outlets, and a first identification circuit;

a control circuit; the control circuit configured to:

separately communicate over a communications channel with the first identification circuit and a second identification circuit associated with a second number of power outlets;

receive data representing the first and second numbers of power outlets;

determine, using the received first and second numbers of power outlets, a total number of power outlets in the system; and control application of power to the first and second numbers of power outlets using the determined total number of power outlets in the system.

23. The system of claim 22, wherein the first and the second identification circuits include unique addresses.

* * * * *